United States Patent
Chidlovskii et al.

(10) Patent No.: US 7,296,223 B2
(45) Date of Patent: Nov. 13, 2007

(54) SYSTEM AND METHOD FOR STRUCTURED DOCUMENT AUTHORING

(75) Inventors: Boris Chidlovskii, Meylan (FR); Hervé Déjean, Grenoble (FR)

(73) Assignee: Xerox Corporation, Stamford, CT (US)

( * ) Notice: Subject to any disclaimer, the term of this patent is extended or adjusted under 35 U.S.C. 154(b) by 494 days.

(21) Appl. No.: 10/607,667

(22) Filed: Jun. 27, 2003

(65) Prior Publication Data

US 2004/0268236 A1 Dec. 30, 2004

(51) Int. Cl.
*G06F 15/00* (2006.01)
*G06F 17/00* (2006.01)

(52) U.S. Cl. ............... 715/513; 715/501.1; 704/257
(58) Field of Classification Search ........... 715/513, 715/508, 501.1
See application file for complete search history.

(56) References Cited

U.S. PATENT DOCUMENTS

| | | | | |
|---|---|---|---|---|
| 5,689,620 A | * | 11/1997 | Kopec et al. ............. | 706/12 |
| 5,706,364 A | * | 1/1998 | Kopec et al. ............. | 382/159 |
| 5,956,726 A | * | 9/1999 | Aoyama et al. ............ | 707/102 |
| 6,003,048 A | * | 12/1999 | Fallside ................. | 715/513 |
| 6,014,680 A | * | 1/2000 | Sato et al. ............. | 715/513 |
| 6,083,276 A | * | 7/2000 | Davidson et al. ......... | 717/107 |
| 6,202,072 B1 | * | 3/2001 | Kuwahara ............... | 715/513 |
| 6,360,215 B1 | * | 3/2002 | Judd et al. ............. | 707/3 |
| 6,513,006 B2 | * | 1/2003 | Howard et al. ........... | 704/257 |
| 6,643,633 B2 | * | 11/2003 | Chau et al. ............. | 707/1 |
| 6,714,939 B2 | * | 3/2004 | Saldanha et al. ........ | 707/102 |
| 6,718,516 B1 | * | 4/2004 | Claussen et al. ........ | 715/513 |
| 6,941,510 B1 | * | 9/2005 | Ozzie et al. ............ | 715/513 |
| 6,981,212 B1 | * | 12/2005 | Claussen et al. ........ | 715/513 |
| 2004/0103091 A1 | * | 5/2004 | Lindblad et al. ........ | 707/3 |
| 2004/0249795 A1 | * | 12/2004 | Brockway et al. ........ | 707/3 |

OTHER PUBLICATIONS

Cowan et al., "Rita-An Editor And User Interface For Manipulating Structured Documents" Sep. 1991; pp. 125-149.*
Kotsakis, Evangelos; "Structured Information Retrieval In XML Documents"; 2002; pp. 663-667.*
Ma et al.;"Extracting Unstructured Data from Template Generated Web Document";2003;ACM;pp. 512-515.*

(Continued)

*Primary Examiner*—William Bashore
*Assistant Examiner*—James J. Debrow
(74) *Attorney, Agent, or Firm*—Jeannette M Walder

(57) ABSTRACT

A method for creating a structured document, wherein a structured document comprises a plurality of content elements wrapped in pairs of tags, includes parsing a document of a particular type containing content into a plurality of content elements; and for each content element, suggesting an optimal tag according to a tag suggestion procedure. The tag suggestion procedure includes providing sample data which has been converted into a structured sample document; deriving a set of tags from the structured sample document; evaluating the set of tags according to tag suggestion criteria to determine an optimal tag for the content element. The optimal tag may be a single tag or a pattern of tags which maximizes a similarity function with patterns found in the sample data.

20 Claims, 5 Drawing Sheets

OTHER PUBLICATIONS

Peterson, John, Untagged Data in Tagged Environments: Choosing Optimal Representations at Compile Time,1989, ACM, pp. 89-98.*

Lin et al.,"Learning to Extract Hierarchical Information from Semi-structured Documents", ACM, 2000, pp. 250-257.*

Hervé Déjean, "*Learning Syntactic Structures with XML*", in Proceedings of CoNLL-2000, Lisbon, Portugal, 2000, p. 133-135.

Hervé Déjean, "*Learning Rules and their Exceptions*", Journal of Machine Learning Research, Mar. 2, 2002:p. 669-693.

Marc Dymetman, Veronika Lux and Aarne Ranta, "*XML and Multilingual Document Authoring: Convergent Trends*", Proceedings of the The 18th International Conference on Computational Linguistics (COLING 2000), Saarbruecken, 2000, p. 243-249.

George Foster, Philippe Langlais, Elliott Macklovitch, and Guy Lapalme, "*TransType: Text Prediction for Translators. Demonstration Description.*" In Proceedings of the 40th Annual Meeting of the Association for Computational Linguistics (ACL), Philadelphia, Jul. 2002, p. 93-94.

L. A. Hermens and J. Schlimmer, "*A machine learning apprentice for the completion of repetitive forms*". New York, NY: Cambridge University Press, 1993, p. 1-13.

Claude E. Shannon, "*Prediction and Entropy of Printed English*", Bell Systems Technical Journal, 1951, p. 50-64.

Arnaud Sahuguet, *Everything You Ever Wanted to Know About DTDs, But Were Afraid to Ask.* (Extended Abstract), WebDB Workshop, 2000, p. 171-183.

Ke Wang and Huiqing Liu, *Discovering typical structures of documents: a road map approach.* In: ACM SIGIR Conference on Research and Development in Information Retrieval, Aug. 1998, p. 1-9.

S. Nestorov, S. Abiteboul, and R. Motwani, *Extracting schema from semistructured data.* In Proceedings of the ACM SIGMOD International Conference on Management of Data, Seattle, Washington, May 1998, p. 1-12.

* cited by examiner

SYSTEM AND METHOD FOR STRUCTURED DOCUMENT AUTHORING

FIELD OF THE INVENTION

This invention relates generally to systems and methods of document generation, and more particularly to a system and method for converting a generic document into a structured document. This invention also relates to a system and method for predicting structure and content during authoring of a structured document.

BACKGROUND OF THE INVENTION

Many systems and databases contain data in incompatible formats. One of the most time consuming challenges for developers has been to exchange data between incompatible systems over the Internet. XML permits data to be exchanged between incompatible systems. Converting data to XML format can greatly reduce this complexity and create data that can be read by many different types of applications. Because of this XML has become a standard format for information exchange in IT applications and systems. However, the number of documents available/generated in XML format remains fairly low as compared to documents in other formats. First, converting documents from other formats into XML is often difficult and time-consuming. Second, because of the particular verbosity and lengthiness of XML documents, creating new XML documents is also a time-consuming process. Creation of an XML document requires permanently interleaving document content (textual data) with semantic tags and attributes according to a Document Type Definition or DTD (a DTD defines the legal elements and structure of an XML document), which generation process is frequently tedious and error-prone.

The appearance of various XML editors help the designer partially reduce document generation overhead by offering an advanced graphic interface with menu-based selection of elements/attributes and a possibility to align the document generation with a corresponding DTD by validating entire files or their fragments. Although DTDs serve well for document validation, they provide little help during document editing or creation. The main reason for this is that most DTDs are designed by humans before any valid XML documents are created; as result many DTDs either contain errors or are too general, that is, they allow a much greater degree of ambiguity than the actual documents expose. Moreover, suggesting tree-like patterns with DTDs is simply impossible, since most element definitions are regular expressions describing infinite sets of possible element contents, while document authoring is a sequence of instantiations of the element definitions. What is needed is a method of easily converting a document from one format into a structured document, such as an XML document.

The need for strongly structured documents increases with the development of new software applications (such as the semantic web) and new standards (SGML, XML, etc.). Structured documents can be viewed as composed of two components: the content part and the (tree-like) structure part. Authoring assistants have been developed, especially for helping authors create the structural markup of their documents, the most widely used being the DTD or XML-Schema checker for checking XML documents. Some tools also allow tagging of textual components semi-automatically using tagging/parsing techniques. Many structured documents repeat the same content components at various locations throughout the document. What is needed is a method of predicting repeated both structure and content components during document authoring.

Text prediction is a widely developed art. Historically, one of the first studies on text prediction was published by C. Shannon (Claude E. Shannon, "*Prediction and Entropy of Printed English*", Bell Systems Technical Journal, pp. 50-64, 1951) presenting his game ("Shannon game"). The purpose of the Shannon game is to predict the next element of text (letters, words) using the preceding context. Shannon used this technique to estimate bounds on the entropy of English.

Many applications propose word/text completion using simple techniques such as MRU (Most Recent Used) and Lookup in some files (these files can be the current file, the buffer, the clipboard, specific lexicons, databases, etc.). More sophisticated prediction systems have been developed, such as (Multilingual) Natural Language Authoring (Marc Dymetman, Veronika Lux and Aarne Ranta, "*XML and Multilingual Document Authoring: Convergent Trends*", Proceedings of the 18th International Conference on Computational Linguistics (COLING 2000), pp. 243-249, Saarbruecken, 2000) and form completion (some application programs such as MS Excel propose a cell). Hermens and Schlimmer (L. A. Hermens and J. Schlimmer, "*A machine learning apprentice for the completion of repetitive forms*". New York, N.Y.: Cambridge University Press, 1993) propose a learning approach (decision trees) suggesting text for form fields. They also apply ML algorithms in order to predict what the user of an electronic organizer is going to write, but the system only allows predictions from a predefined structure (forms).

Foster et al. (George Foster, Philippe Langlais, Elliott Macklovitch, and Guy Lapalme, "*TransType: Text Prediction for Translators. Demonstration Description*" in Proceedings of the 40th Annual Meeting of the Association for Computational Linguistics (ACL), Philadelphia, July, 2002) describe a technique for translation completion. The aim of the TransType project is to develop a new kind of interactive tool to assist translators. The proposed system will observe a translator as s/he types a text and periodically proposes extensions to it, which the translator may either accept as is, modify, or ignore. The system takes into account not only the source text, but the already-established part of the target text.

SUMMARY OF THE INVENTION

A method for creating a structured document, according to one aspect of the invention, wherein a structured document includes a plurality of content elements wrapped in pairs of hierarchically nested tags, includes parsing a document of a particular type containing content into a plurality of content elements; and for a selected content element, suggesting an optimal tag according to a tag suggestion procedure. The tag suggestion procedure includes providing sample data in the form of structured sample documents; analysing patterns in the sample data to derive a set of tag suggestions; deriving a set of candidate tags from the set of tag suggestions for the selected content element; and evaluating the set of candidate tags according to tag suggestion criteria to determine an optimal tag for the selected content element. The optimal tag may be a single tag or a pattern of tags which maximizes a similarity function with patterns found in the sample data.

The method can be used as an structure adviser component for authoring XML documents. The tag suggestion procedure can use sample data in the form of existing structured documents or it can use the prior portions of document which is being authoried. The method analyzes available sample data in order to suggest tags and tree patterns the user is most likely to use next. An architecture and method for analyzing sample data, determining suggestion candidates and estimating optimal suggestions for any position in the document being authored are provided.

Since the XML format became a de facto standard for structured documents, the IT research and industry have developed a number of commercial XML editors (XML Spy, Xeena, ElfData, Morphone, etc.) and public ones (see http://www.oasis-open.org/cover/publicSW.html#editing for details) to help users produce structured documents in XML format. The system and method for structured document generation intervenes during the document editing/authoring process to suggest one tag or an entire tree-like XML pattern the user is most likely to use next. Adviser suggestions are based on finding analogies between the currently edited fragment and sample data, which is either previously generated documents in a collection or the history of the current document editing. The structure adviser is beneficial in cases when, for example, no DTD is provided for XML documents, when the DTD associated with the document is too loose or general and when sample data contain specific patterns not captured in the DTD. The method for finding optimal suggestions may be used at any step in the process of generating a new structured document or in the process of converting a document of an unstructured format into a structured document.

In accordance with another feature of the invention, a method for authoring of a structured document, wherein a structured document comprises a plurality of content elements wrapped in pairs of hierarchically nested tags, includes generating content elements wrapped in pairs of tags; and for a selected tag, suggesting an optimal content fragment according to a content suggestion procedure. The content suggestion procedure includes providing sample structured documents; deriving a set of content fragments from the sample structured documents; and evaluating the set of content fragments according to a content fragment suggestion criteria to determine an optimal content fragment suggestion for the tag, wherein the optimal text fragment suggestion is the most probable content fragment for the selected tag.

The method of authoring a structured document makes use of machine learning techniques in order to generate textual suggestions using existing structured documents and/or the current document as training data. These suggestions are based on regularities occurring in a corpus of similar documents. During the authoring step, each time a new tag is inserted in a document, content suggestions (if any) are proposed to the author, who validates one or refuses all of them. The method considers content advising as a categorization problem; it combines machine learning algorithms and document structure in order to predict textual chunks during the authoring step; it uses contextual (structure and content) information for suggestion computation; and computed suggestions are automatically proposed to the author when the appropriate context is detected.

DETAILED DESCRIPTION OF THE PREFERRED EMBODIMENTS

The method of the invention may be used in the generation and authoring of any structured document, such as XML documents. For convenience only, the method of the invention will be described with respect to the generation and authoring of XML documents.

All XML documents are made up the following building blocks: elements, tags, attributes, entities, PCDATA and CDATA. Elements are the main building blocks of both XML and HTML documents. Examples of XML elements are "note" and "message". Elements can contain text, other elements, or be empty. Tags are used to markup elements. A starting tag like <element_name> marks up the beginning of an element, and an ending tag like </element_name> marks up the end of an element. Attributes provide extra information about elements. Attributes are always placed inside the starting tag of an element. Attributes always come in name/value pairs. Entities are variables used to define common text. Entity references are references to entities. PCDATA means parsed character data, i.e., the text found between the start tag and the end tag of an XML element. PCDATA is text that will be parsed by a parser. Tags inside the text will be treated as markup and entities will be expanded. CDATA also means character data, i.e., text that will not be parsed by a parser. Tags inside the text will not be treated as markup and entities will not be expanded.

XML documents may have one or more DTDs associated with them. A DTD defines the legal building blocks of an XML document, i.e., the document structure with a list of legal elements. If an XML document contains a DTD, it can carry a description of its own format with it. Application programs can use a standard DTD to verify that the data received is valid. DTDs can be used to verify the data written into the XML document. However, the method of the invention can be used when no DTD is provided for XML documents, when the DTD associated with the document is too loose or general and when sample data contain specific patterns not captured in the DTD.

Figure 1:
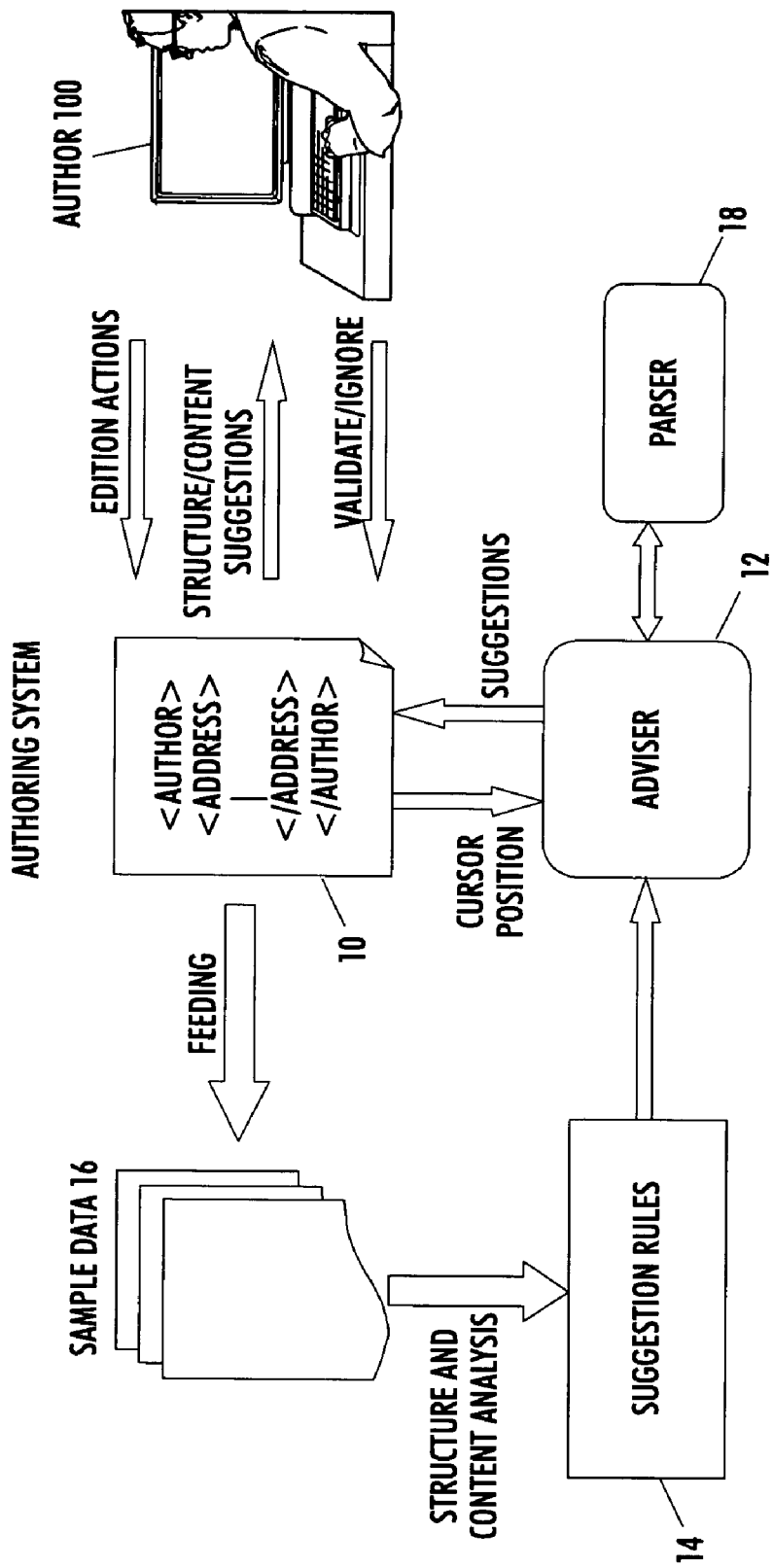
FIG. 1 is a block diagram of an adviser system according to one aspect of the invention.

A system for implementing a structure adviser using the method of the invention is shown in FIG. 1. In this embodiment of the invention, generic documents containing content (documents which are not in the format of a structured document) are converted to XML documents. This process involves taking the content information from the original document and embedding it between an opening tag and a closing tag. Referring to FIG. 1, author 100 begins editing document 10; i.e., author 100 causes document 10 to be parsed into various content elements and begins selecting opening and closing tags for each content element. During the editing process, when the author 100 selects a particular content element, adviser 12 suggests an optimal tag. The suggested tag may be an opening tag, a closing tag or a tag pattern. The author may then accept the suggestion or ignore it.

Adviser 12 employs a tag suggestion process to select an optimal tag to present to the author. The tag suggestion process takes sample data 16, which in this example are XML documents having a DTD. These XML documents are similar to the document 10 being converted in that they were created from similar generic documents. Sample data 16 are analyzed and evaluated in block 14 in order to create a set of tag suggestions and tag suggestion rules. Since the sample data 16 already has a DTD, the set of tag suggestions are in addition to the DTD. If the sample documents had no DTD, tag suggestions would still be generated. Adviser 12 uses the result of parsing the document with parser 18 and the tag suggestion rules to derive a set of candidate tags for the selected content element from the set of tag suggestions. Adviser 12 then uses tag suggestion criteria for selecting an optimal tag from the set of candidate tags to present to the author. As the author 100 proceeds with editing of document 10, the tags chosen by the author can be used to modify and update the adviser 12.

The adviser intervenes in the cases of editing of the document structure, that is, each time the author opens or closes a tag. Note that at any given position in the document, the user cannot add arbitrary tags, but only tags allowed by the associated DTD (if any, or by basic XML rules). For example, the element definition <!ELEMENT A (B|C)*> allows either element (tag) B or C at any position within element A, without prioritizing any of the two. In the general case, DTDs associated with document(s) might be tight or loose; tight DTDs define a highly rigid and regular structure, thus allowing only one tag at most positions in a document; these DTDs are frequent in database-like document collections. However, tight DTDs are rather an exception, a much more frequent case is that of loose DTDs, with multiple possible tags at most positions in a document.

The adviser is built around a set of suggestion rules; which rules are learned by a learning component from available sample data. Learning from sample data can be done on-line or off-line. Off-line learning takes place when the sample data is a collection of documents supplied in advance or previously generated by users. The suggestion rules learned by the system offline remain unchanged during all the process of document editing, until the sample collection is extended with new documents and the system can re-learn suggestion rules from the updated collection.

Alternatively, the rules can be learnt on-line, during the process of editing the current structured document. Sample data available for learning is initially empty and grows as long as the user edits the document. Suggestion rules are learned incrementally, each elementary edition can (immediately or with some delay) change some suggestion rules, since any new tag addition changes the frequencies of tags/patterns and therefore can alter possible suggestions by the adviser.

EXAMPLE 1

Assume that a collection of XML documents with an associated DTD was provided for off-line learning and the learning component has analyzed the collection and inferred patterns for authoring new documents. Now assume that the user edits a new document with the same DTD and at some point opens/closes tag <A>. Below we consider four different examples of element A's structure imposed by the DTD and show how the adviser can help the user by suggesting the most probable tag or pattern. Table 1 below gives detail on tag patterns and their frequencies in sample data.

Case 1. DTD contains the element definition <!Element A (B+)> for A, that is, element A can contains only sub-elements B. There is no ambiguity and system proposes tag B as a unique choice or automatically expands it. On the other hand, the system can propose pattern BB as the most probable one. (Note that X=A (BB) is an abbreviation for the XML fragment <X><A><B>. . . </B><B>. . . </B></A></X>.)

Case 2. DTD contains definition <!Element A (B+|C+|PCDATA)>, thus allowing either B or C as the first sub-element of A or PCDATA. From the analysis of sample data, the adviser can propose the most likely element first, C, with estimated probability Pr=0.8 (Pr~0.8 means that the estimated probability of the given suggestion is about 0.8); such a decision the adviser made from sample data where <A> followed by <C> occurred 8 times, <A><B> occurred twice, and <A> followed by PCDATA never occurred. Also, the system may suggest pattern A=CC.

Case 3. DTD contains two definitions <!Element A (PCDATA)> and <!Element X (A*)>: once the tag A is open, user can type in only PCDATA as one uniquely allowed by the DTD, but when closing the second tag A within X, the adviser suggests to close also tag X.

Case 4. Analysis of sample data for the suggestions goes beyond simple statistics on element mutual occurrences. Assume that DTD contains <!Element X (A+)>, <!Element Y (A+)>, <!Element A (B+|C+)>, and user opens an element <A>. Then, the learning component can find out that though elements B and C follow element A quite equally, B follows A when A is (structurally) preceded by X, while C follows A when A is preceded by Y. Thus the system's advice will depend on the context of tag A, that is, which tag precedes it. Table 1 shows an example when tag A is preceded by tag Y, thus adviser suggests tag C and pattern CC as the most probable ones.

TABLE 1

Four examples of structure advisor at work.

| | Case | | | |
|---|---|---|---|---|
| | 1 | 2 | 3 | 4 |
| DTD Fragment | <!Element A (B+)> | <!Element A (B+ | C+| PCDATA)> | <!Element A (PCDATA)> <!Element X (A*)>: | <!Element X (A+)> <!Element Y (A+)> <!Element A (B+|C+)> |
| Patterns in Sample Data | A = BBB A = BB | A = CC A = CCC A = BB | X = AA X = A | X = A(BB) X = A(BBB) Y = A(CC) |
| Occurrences | 1 4 | 6 2 2 | 5 2 | 2 2 4 |

TABLE 1-continued

Four examples of structure advisor at work.

| | Case | | | |
|---|---|---|---|---|
| | 1 | 2 | 3 | 4 |
| Editing action | Opening tag A | Opening tag A | Closing tag A when X = AA | Opening tag A when Y = A |
| DTD allows | B | B or C or PCDATA | Open A or close X | Open B or open C |
| Suggested Tag | B (Pr~0.8) | C (Pr~0.8) | Close X (Pr~1.0) | C (Pr~1.0) |
| Suggested Pattern | BB (Pr~0.8) | CC (Pr~0.6) | X = AA (P~0.72) | CC (Pr~1.0) |

In total, for any addition to the document structure, being either an opening tag or a closing tag, the structure adviser can offer the most probable variants, these variants and their estimated probabilities being induced from the sample data. The success of the adviser is measured by the ratio of good suggestions, which reduces document generation overload. The induction of good suggestion rules requires a deep analysis of structural patterns in sample data. In the following section we describe a method for determining optimal patterns from sample data and a data structure for pattern representation and retrieval.

At any step of the document generation, the structure adviser considers a set of candidates for both one-tag and pattern suggestions (i.e., a pattern of tags, usually in the form of a tree pattern) and detects the optimal ones for either case. The optimal candidate is one that is most probable for the next document editing step; it maximizes a certain similarity with patterns found in the sample data (this similarity function described below). Suggesting a tree pattern is more difficult than suggesting one tag, since the pattern suggestion should cope with the difficulty of selection among candidates of different size. Indeed, small-size patterns are more frequent in sample data than large-size ones. On the other hand, proposing a large pattern may be more beneficial because, if accepted, a large pattern further reduces the editing overhead. The method is aimed at finding an optimal trade-off between candidates of different sizes and frequencies. In the following, we pay the main attention to finding optimal patterns, as the one-tag suggestion is considered as a special case when the pattern size is limited to 1.

Tree pattern t is a connected fragment of a structured document. The depth of t is denoted d(t) (tree leaves have depth 0); the size of t is denoted as |t| and measured as the number of nodes in the tree. Tree pattern t is a prefix of pattern tree $t_1$ if $t_1$ can be obtained from t by appending zero or more nodes.

To detect an optimal suggestion for the next step of document generation, we consider a set of candidates for suggestion and measure the similarity between a candidate pattern c and a set T of tree patterns allowed in a given context. Below we introduce three requirements a good similarity function should satisfy. Other similarity functions satisfying other requirements may also be used.

1. A similarity measure between a candidate c and pattern set should provide a good trade-off between size and frequency of candidates.

2. The similarity measure should be easily computed.

3. The similarity evaluation should not be recomputed at each new step of document generation. Changing context (due to advance in the editing) may alter or reduce the candidate set, but it should not change the similarity values.

Context-free suggestions. Consider patterns of the depth d for opening tag X. Initially, we ignore the context in which tag X is getting opened (see cases 1, 2 and 3 in Table 1); the context-sensitive case (like case 4 in Table 1) will be considered in the following section. Assume that a pattern set T (X)={$t_i$} is found in sample data, each pattern $t_i$ being a structured sub-tree rooted at X of depth d with its probability (normalized frequency) $pr_i$, where $\Sigma pr_i=1$. When the user is authoring a document D, the editing process is seen as a sequence of elementary actions on the document structure, $D_0$, $D_1=D_0+action_o$ . . . . At step j of the authoring process, the user opens/closes tag X and the adviser should propose how to extend the current state of $D_j$ with one most probable tag or most probable pattern of the depth d.

Now we define a similarity measurement that satisfies the three requirements described above. First, for a given pattern set T, we build the set C of candidates as the set of all patterns in T with all their prefixes, C={c | c is a prefix of $t_i$ ∈ T}. Second, we introduce a similarity function between a candidate c ∈ C and a tree pattern $t_i$ ∈ T as follows:

1. sim (c, $t_i$)=|c |/|$t_i$ |, if c is a tree-prefix of $t_i$ 2. sim (c, $t_i$)=0, otherwise.

Note that sim (c, $t_i$)=1 if c=$t_i$. The optimal candidate is a candidate c ∈ C that maximizes the aggregate similarity measure SIM (c, T) given by $$SIM(c, T) = \sum_{t_i \in T} sim(c, t_i) \cdot pr_i$$

EXAMPLE 2

Assume the element X is defined in DTD as <!ELEMENT X (AB*|C*)> and the following table shows occurrences of all contents of element X in the sample data (note they all fit the DTD definition).

| Candidate c | Frequency | Probability |
|---|---|---|
| A | 2 | 0.2 |
| C | 2 | 0.2 |
| ABB | 3 | 0.3 |
| AB | 2 | 0.2 |
| ABBB | 1 | 0.1 |

The set of pattern candidates for opening tag X coincides with the pattern set T(X), C=T(X)={C,A,AB,ABB,ABBB}. For candidate A, we have sim(A,C)=0, sim(A,A)=1, sim(A, AB)=0.5, sim(A,ABB)=0.33 and sim(A,ABBB)=0.25. Then we obtain the aggregate similarity function value for candidate A, SIM(A,T)=0.425. Similarly, for other candidates in C we have SIM(C,T)=0.2, SIM(AB,T)=0.45, SIM(ABB,T)= 0.375, SIM(ABBB,T)=0.1. Therefore, pattern AB is the optimal (context-free) suggestion for opening tag X.

When considering one-tag suggestions, we constrain the candidate set C to only one-tag pattern, $C_1=\{c \in C \ |c|=1\}$ and determine the optimal candidate in the same manner. In the example above, C, contains two one-tag candidates, $C_1=\{A, C\}$, and A is the optimal one-tag suggestion.

Context-aware suggestions. Example 2 explains context-free suggestions for the case of tag opening. Now we consider the case of tag closing and its difference from the tag opening case. The difference is that the closed tag and possibly some preceding tags represent the context for the next suggestion and, taking the context into consideration should result into more accurate suggestions.

Consider again example 2 and assume the user has selected pattern ABB, filled in elements A, B and B and closed them. What should the adviser propose next? Taking the context into consideration will constrain the set of candidates keeping the calculation of optimal candidate unchanged. The candidate set in context $t_{cxt}$ is defined as $C(t_{ctx})=\{c \in C\ |t_{cxt}$ is a prefix of c$\}$. Similarly, $C_1(t_{ctx})=\{c \in C\ |t_{cxt}$ is a prefix of c, $|c|=|t_{cxt}|+1\}$ is a set of one tag candidates. For our example, we have $t_{cxt}$=ABB, $C(t_{ctx})$= {ABB, ABBB} and $C_1(t_{ctx})$={ABBB}. The candidate evaluation remains unchanged except the pattern probabilities which are re-weighted because of shrinking the candidate set. However, the normalization of pattern probabilities will increase the absolute values of the aggregate function, but it will not change their relative order. This allows us to keep the evaluation of optimal suggestions unchanged. Since ABB is the optimal pattern candidate, the adviser will suggest to close tag X in the context ABB. Similarly, tag B is the (only) one-tag suggestion.

Context-aware suggestions for closing tags, permits us to revise the context-free suggestions for opening tags. Indeed, in example 2, we could have considered the context of opening tag X in the same way we have considered the context ABB for closing tag B. Consider now the case 4 in Table 1, where the optimal suggestion for opening tag A strongly depends on the tag preceding A. We build the candidate set for tag A starting from one higher level in the document, that is, $T^{+1}(A)$={X(A(BB)), X(A(BBB)), Y(A (CC))}. Once we have extended the context for element A, we can proceed with the construction of candidate set and determination of optimal suggestions for each context as before.

The context-aware suggestions can be generalized to the context of any depth. d-context of a tag A is the sequence of ancestors of A in the document structure $(e_1, e_2, \ldots, e_d)$, where element $e_i$ is an immediate ancestor of $e_{i+1}$ and $e_d$ is the immediate ancestor of A. d-context pattern set $T^{+d}(A)$ for element An in sample data consists of all contents of A, with each pattern being concatenated with the leading d-context of A. Once the d-context pattern set is built, the candidate set and optimal suggestions are determined as described above. When the adviser should suggest a pattern for an opening tag A, it applies the d-context of A from the editing document to identify the optimal candidate.

Figure 2:
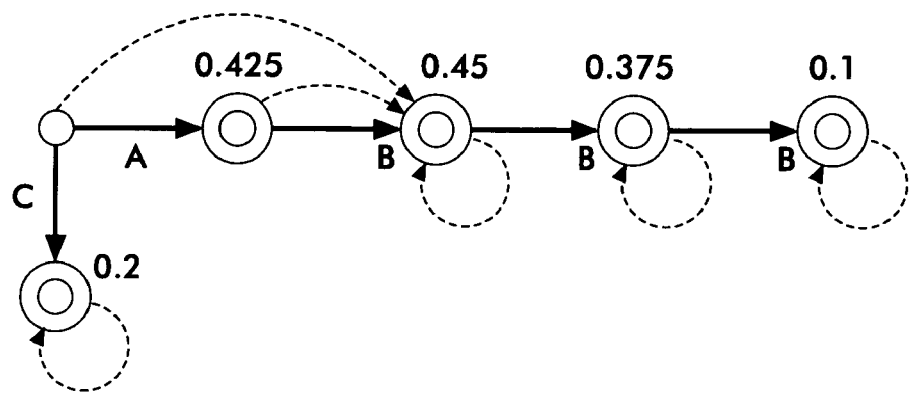
FIG. 2 is a diagram of the prefix tree for example 2.
Figure 3:
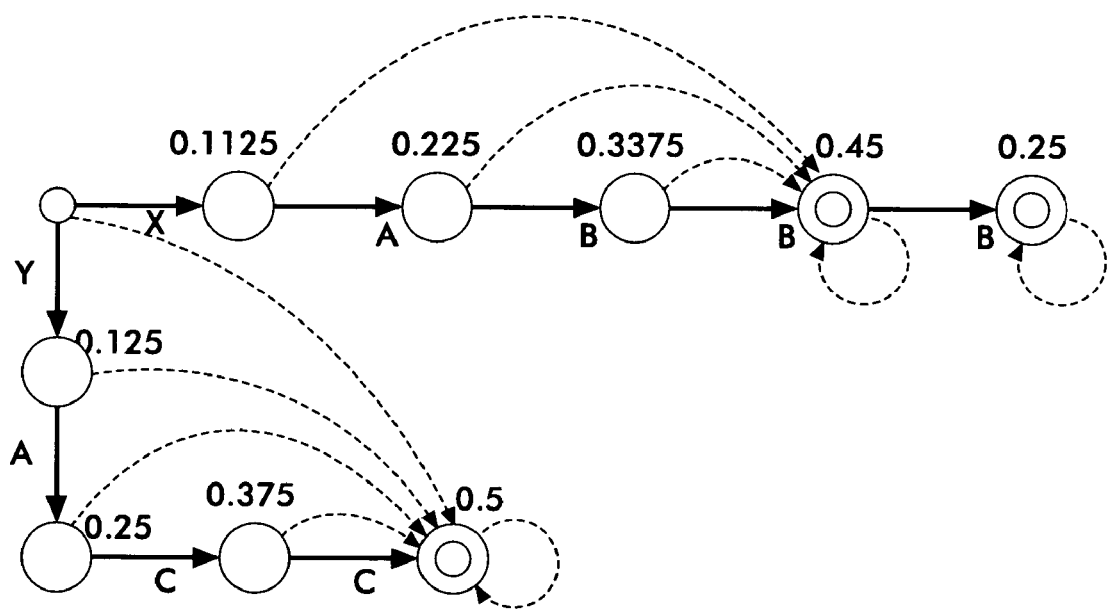
FIG. 3 is a diagram of the prefix tree automaton for case 4 of Table 1.

Efficient data structure. The work of the adviser assumes that all candidates are quickly and efficiently identified, that is, for any editing step, the adviser can promptly retrieve the optimal candidate. Here, we propose an efficient data structure for representation and retrieval of optimal candidates for both context-free and context-aware suggestions. For a given candidate set T, we represent the candidate set C (along with associated aggregation function values) in the form of the prefix automaton PA. This automaton has states and it contains transitions of two types, indicated with solid and dotted arcs. The automaton has no cycles and any state corresponds to a unique sequence of transitions from the initial state through solid arcs and corresponds to a candidate c in C; the state is labeled with the aggregation function value SIM(c,T) for c; final states in the automata correspond to patterns in T. Additionally, each state c contains the optimal pattern provided that c is the current context. FIGS. 2 and 3 show the prefix automata for example 2 and case 4 in Table 1; final states in automata are double-circled. Since all optimal suggestions are again states in automata, an optimal suggestion for a state c is shown as a reference linking (by a dotted arc) state c with the corresponding state.

Finding the optimal candidate for context $t_{ctx}$ is as follows; note that the context-free evaluation corresponds to the empty context $t_{ctx}=\in$. The context $t_{ctx}$ is a state in PA if $t_{ctx}$ matches a candidate c in C. The candidate set in context $t_{cxt}$, $C(t_{ctx})$, is the set of states reachable from state $t_{ctx}$ and the optimal candidate for context $t_{ctx}$ is found by following the dotted arc from the state $c=t_{ctx}$. For example, the initial state $(t_{ctx}=\in)$ of PA in FIG. 2 refers to the state AB as the optimal pattern and state $t_{ctx}$=ABB refers to itself that means "close-this-tag" suggestion.

The structure adviser architecture and method proposed here address the finding of most probable structural patterns of elements in the editing XML document. Clearly, the idea of finding analogies between the currently editing document and sample data is not limited to elements only; it can be extended to other components of XML documents, including element attributes, key dependencies, etc.

The method described above deals with finding optimal patterns and efficient data structures for off-line learning. Once these structures (in the form of prefix automata) are built from sample data, they remain unchanged during the document edition process. If the off-line learning will be extended with the on-line learning, it will impose additional requirements to the data structures, since the states, transitions and associated aggregate values in automata can be updated after any edition step; this will require the design of the incremental and dynamic version of data structures for representation and retrieval of optimal suggestions.

The system and method help users in the tedious process of on-the-fly tagging during authoring of structured documents. The adviser performs statistical analysis in the learning process to adapt its behavior to the documents being used. This system and method may be implemented in various ways, for example, packaged in a software product or as a software component or plug-in for available XML editors or an internal tools to enhance productivity in same services, such as the creation of a richly tagged for a customer.

Figure 4:
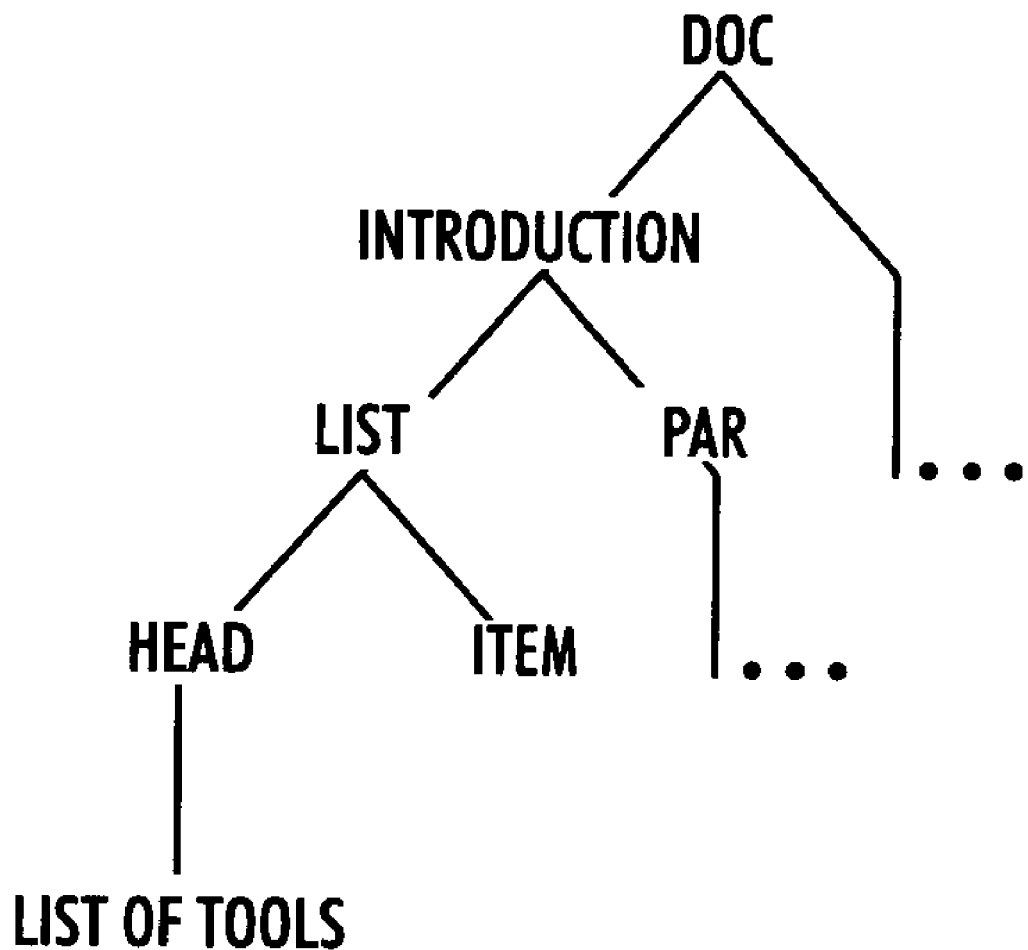
FIG. 4 is a diagram of a portion of a structured document.

In accordance with another feature of the invention, the method may be used to suggest content, such as text, when authoring a structured document (i.e., a content adviser). For example, suppose a list occurring in the introduction of a set of documents always uses a given piece of content ("List of tools:") under the tag head (see FIG. 4). The content adviser will then propose the author insert the content part "List of tools:" after the tag head. The author can validate this suggestion or not. Not all content parts of a document can be predicted, but parts that occur frequently enough in a given position and that often structure the document (such as section title, list head, caption) may be predicted with a very high precision. The content adviser facilitates the authoring task of structured documents, especially, technical documents with a twofold advantage: a reduction in authoring time (less typing) and increased control over the content (suggested content are well-formatted since provided by existing documents).

The content adviser uses a set of already structured documents in order to automatically generate textual suggestions during document authoring. A structured document (XML document, for example) can be represented as a tree (See FIG. 4). A piece of content may be referenced in a document using a partial path from the document root to it (using XPATH formalism, for example). For instance, the paths doc/introduction/list/head/CONTENT (full path) and .*/list/head/CONTENT (partial path) indicate content occurring at some points in a document.

Figure 5:
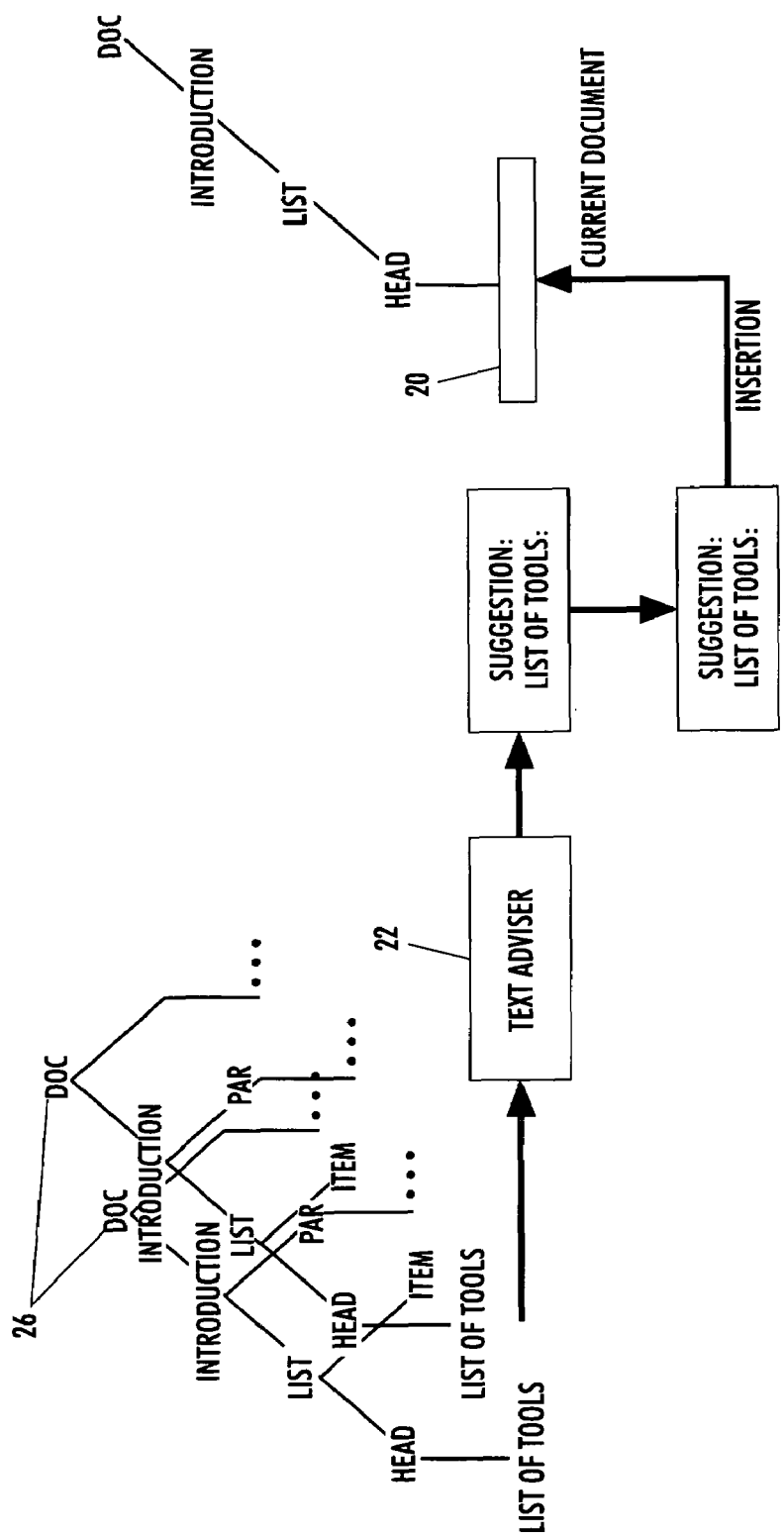
FIG. 5 is a block diagram of a text adviser system according to another aspect of the invention.

A system for implementing a content adviser using the method of the invention is shown in FIG. 5. In this embodiment of the invention, an author creates a new structured document, such as an XML document 20. The author selects various XML tags, such as doc, introduction, list, head. When the author opens the tag "head", the text adviser 22 suggests the text fragment "List of Tools:". If the user validates the text fragment, it is inserted into document 20. If not, no action is taken. Possibly the text adviser could suggest another content fragment, or a selection of text fragments, from which the author may choose or ignore.

Content suggestions are generated using machine learning techniques by analyzing a group of training documents 26 and provided to text adviser 22. The training documents 26 are formated XML documents similar to the type that the author is currently drafting. The training documents are analyzed for common content fragments associated with a particular tag. For example, in FIG. 5, the content fragment "List of Tools:" appears each time the tag "head" is used. A list of content fragments are generated and the content fragments evaluated according to their relevance and importance. Several methods of assigning relevance to content fragments may be used. One way to formulate this problem is to assign a score (a probability, for example) to a piece of content given the tag in which the text occurs: score(text, tag). The simplest way to compute such a score is to compute the ratio between the number of occurrences of this content under the tag and the number of occurrences of the same tag in the training documents. Other more sophisticated functions can also be used (Laplace accuracy, etc. The optimal content suggestion is the text with the highest score for that tag.

While this score is generally a good indicator for a text fragment suggestion, frequently additional information may be required to further evaluate the content fragments. Additional information, such as context information maybe required in order to generate even higher quality predictions. If the system proposes suggestions with a low probability, the rejection rate by the author may be high, and the system may be more of a disturbance than an assistance.

To increase the likelihood of an author's acceptance of a content fragment suggestion, the learning techniques may be modified to take into account the context of the tag containing the piece of content. The structural context of a tag generally consists of the structural tree around the tag. If the same content fragment occurs after the same tree pattern of tags, it is more likely that the author will accept this suggested content fragment. Different methods for assessing context may be used, for example, the rule induction method of Déjean (Hervé Déjean, "*Learning Syntactic Structures with XML*", in Proceedings of CoNLL-2000, Lisbon, Portugal, 2000 and Hervé Déjean, "*Learning Rules and their Exceptions*", Journal of Machine Learning Research, 2(Mar):669-693, 2002). For each tag containing a given piece of content (content fragment), the content adviser will predict, given the structural context of this tag, the probability that that piece of content will appear under the tag. If the probability is high enough, the content fragment can be suggested. Furthermore the system may also be configured so that it builds contexts so that the score of a given piece of content to be assigned to a given tag will be higher than a given threshold, which ensures that the quality of the learned suggestions will be high enough to make the system helpful.

Figure 6:
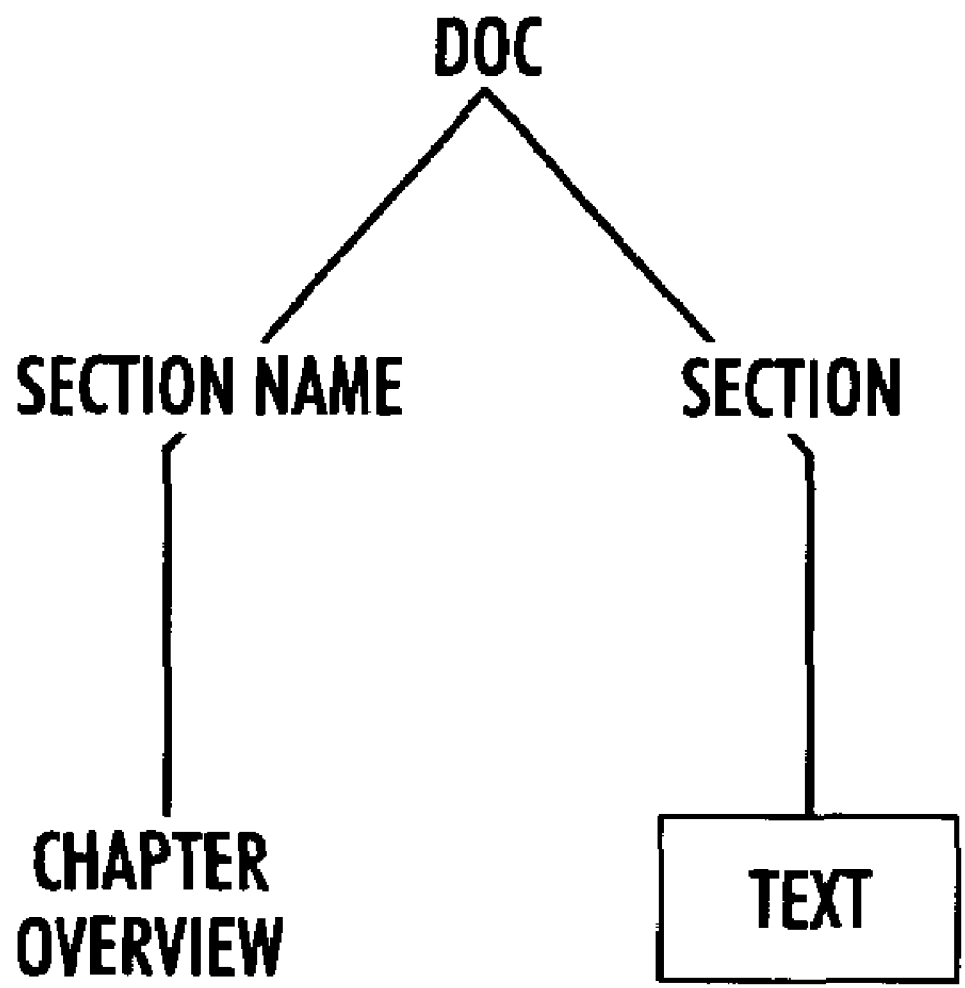
FIG. 6 is diagram of one mixed context for the tag Section: doc/(SectionName/"Chapter Overview", Section/TEXT).

The structural context of a tag can be enriched with content information. For example, the tree doc/(SectionName/"Chapter Overview",Section/CONTENT) is referred to as a mixed context (structure and content) for the tag Section (FIG. 6). This context includes the structure doc/(SectionName/"Chapter Overview",Section which has been enriched with the content "TEXT". More generally, since the problem can be formulated as a categorization problem (assign to a given tag a piece of text that can be represented as a category), all existing machine learning techniques that have been developed for solving this problem can be used to generate content fragment suggestions.

If a good enough score cannot be computed for a particular content fragment, some refined selections can also be applied. For example, the system can be modified to provide scores on small linguistic units, such as a word, a phrase, or a sentence, and not the whole piece of content. A score would be assigned to the small linguistic unit, wherein the score is, for example, a ratio of the number of occurrences of the linguistic unit under the selected tag and the number of occurrences of the selected tag in the training documents. The output format of the learning could be equivalent to a list of triples <tree,content,score>, which associate a score to content in the context tree. Several contents can be a candidate for a same environment. An example of triplet is:

<*/Section/(SectionName/"Chapter Overview",List,List/Head/,"List of Sections", 0.8>

The component tree corresponds to a subtree of the document with possibly content elements. If the tag where the element content should be inserted already has some content, the element content is concatenated to this existing content.

In order to apply such list to a document, standard parsing techniques can be applied (rule engine, finite state automaton, etc.).

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for converting a generic document, wherein a generic document comprises a document in a particular format type, into a structured document, wherein a structured document includes a plurality of content elements wrapped in pairs of hierarchically nested tags, comprising:

parsing the generic document of the particular format type containing content into a plurality of content elements; and for a selected content element, suggesting an optimal tag according to a tag suggestion procedure;

wherein the tag suggestion procedure comprises:

providing sample data in the form of structured sample documents;

analyzing patterns in the sample data to derive a set of tag suggestions and tag suggestion rules;

deriving a set of candidate tags from the set of tag suggestions for the selected content element in accordance with the tag suggestion rules; and evaluating the set of candidate tags according to tag suggestion criteria to determine an optimal tag for the selected content element.

2. The method of claim 1, wherein the tag suggestion criteria comprises satisfying a similarity function.

3. The method of claim 1, wherein the set of tag suggestions are generated during creation of the structured document.

4. The method of claim 1, wherein the set of tag suggestions are generated prior to creation of the structured document.

5. The method of claim 1, wherein the structured sample document comprises an XML document having a DTD associated with it.

6. The method of claim 1, wherein the set of tag suggestions includes tree patterns of tags.

7. The method of claim 6, wherein the tag suggestion criteria comprises balancing size of tree patterns of tags and frequency of occurrence of tree patterns of tags in the sample data.

8. The method of claim 1, wherein the optimal tag maximizes a similarity function with patterns found in the sample data.

9. The method of claim 1, wherein the set of tag suggestions includes a set of tree patterns of tags $t_i \in T$, and a set C of candidates is a set of all patterns in T with all their prefixes, $C=\{c | c \text{ is a prefix of } t_i \in T\}$;

wherein a similarity function between a candidate $c \in C$ and a tree pattern $t_i \in T$ satisfies:

sim $(c, t_i) = |c|/|t_i|$, if c is a tree-prefix of $t_i$;

sim $(c, t_i) = 0$, otherwise; and wherein the optimal tag comprises a context-free candidate $c \in C$ that maximizes an aggregate similarity measure SIM (c,T), where $$SIM(c, T) = \sum_{t_i \in T} sim(c, t_i) \cdot pr_i.$$

10. The method of claim 9, wherein a candidate set in context $t_{cxt}$ is defined as $C(t_{cxt})=\{c \in C | t_{cxt} \text{ is a prefix of } c\}$; and wherein the optimal tag comprises a context-aware candidate $c \in C$ that maximizes an aggregate similarity measure SIM (c,T) where $$SIM(c, T) = \sum_{t_i \in T} sim(c, t_i) \cdot pr_i.$$

11. The method of claim 1, wherein content comprises text.

12. A method for authoring of a structured document, wherein a structured document comprises a plurality of content elements wrapped in pairs of tags, comprising:

generating content elements wrapped in pairs of tags; and for a selected tag, suggesting an optimal content fragment according to a content suggestion procedure;

wherein the content suggestion procedure comprises:

providing a plurality of sample structured documents;

analyzing the sample structured documents to derive a set of content fragments and content fragment suggestion criteria;

deriving a set of candidate content fragments from the sample structured document associated with the selected tag in accordance with the content fragment suggestion criteria;

evaluating the set of candidate content fragments to determine an optimal content fragment suggestion for the tag, wherein the optimal content fragment suggestion is the most probable content fragment for the selected tag.

13. The method of claim 12, further comprising assigning a score to each content fragment in the set of content fragments, wherein the score is a ratio of number of occurrences of the content fragment under the selected tag and number of occurrences of the selected tag in the sample structured document.

14. The method of claim 13, wherein the optimal content fragment suggestion is the content fragment with the highest score.

15. The method of claim 13, further comprising assigning a context to each content fragment in the set of content fragments, wherein context comprises the structural context of the tag surrounding the content fragment.

16. The method of claim 15, wherein each content fragment is referenced by a partial path from the sample structured document root and the context comprises the partial path of the content fragment in the sample structured document.

17. The method of claim 15, wherein the context of each content fragment in the set of content fragments comprises the structural tree around the tag surrounding the content fragment.

18. The method of claim 13, wherein the optimal content fragment suggestion is the content fragment with the highest score greater than a threshold value.

19. The method of claim 12, further comprising:

selecting a small linguistic unit within each content fragment in the set of content fragments; and assigning a score to the small linguistic unit, wherein the score is a ratio of number of occurrences of the linguistic unit under the selected tag and number of occurrences of the selected tag in the sample structured document.

20. The method of claim 19, wherein the small linguistic unit is a word, a phrase or a sentence.

* * * * *